Dec. 8, 1931.  L. K. SILLCOX  1,835,246
AIR BRAKE
Filed Oct. 13, 1930  3 Sheets-Sheet 3

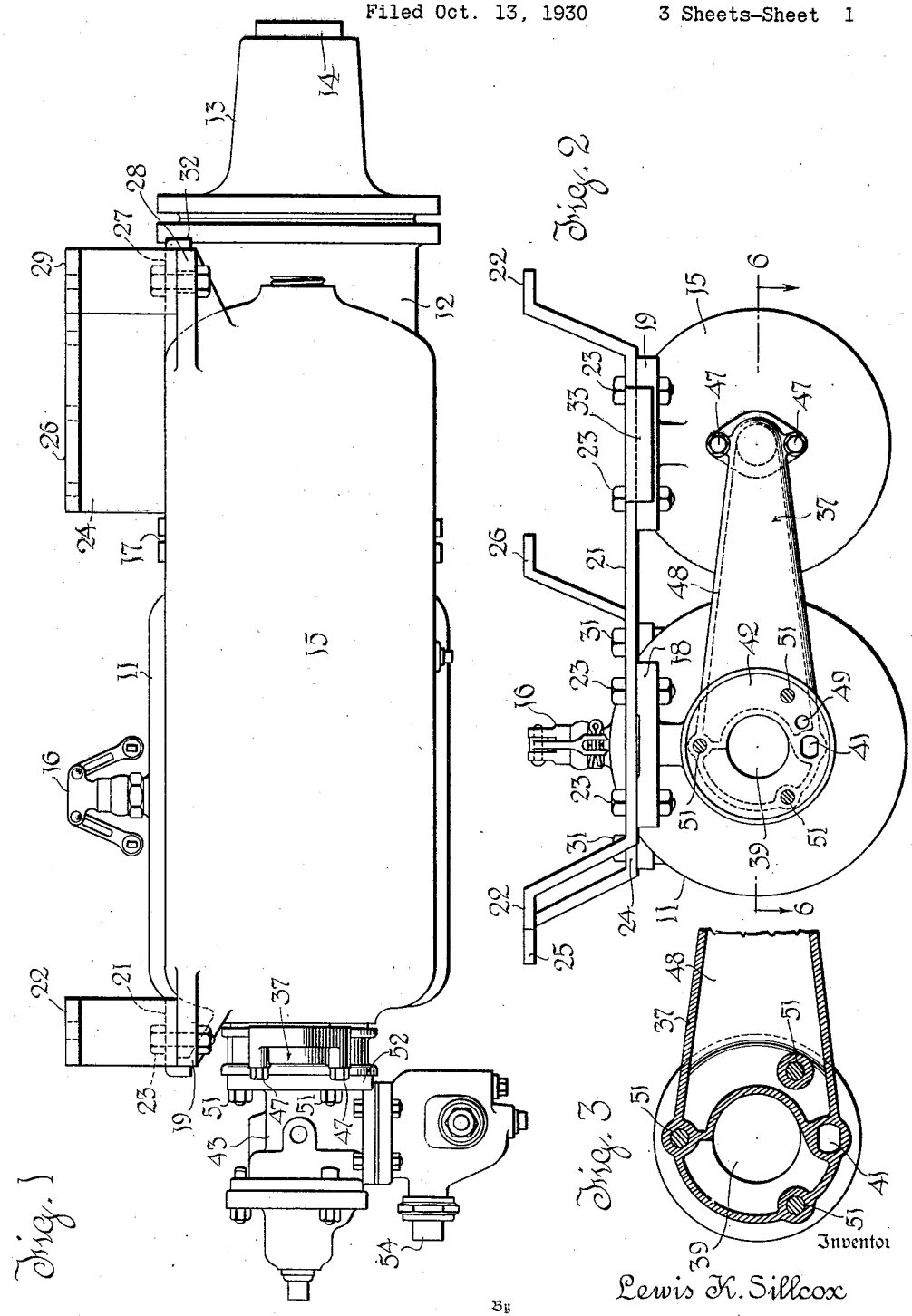

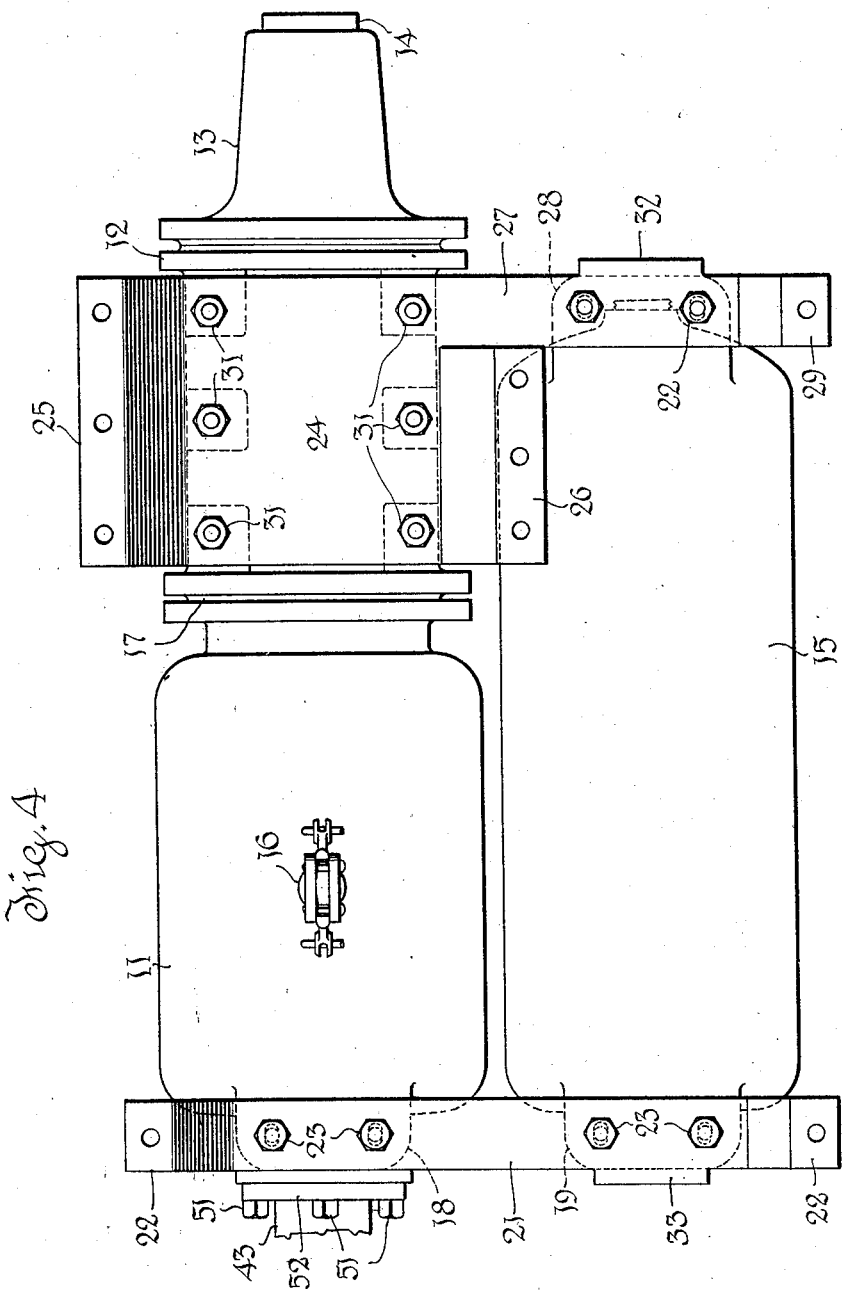

Inventor
Lewis K. Sillcox
By
Dodge and ?
Attorneys

Patented Dec. 8, 1931

1,835,246

UNITED STATES PATENT OFFICE

LEWIS K. SILLCOX, OF WATERTOWN, NEW YORK, ASSIGNOR TO THE NEW YORK AIR BRAKE COMPANY, A CORPORATION OF NEW JERSEY

AIR BRAKE

Application filed October 13, 1930. Serial No. 488,529.

This invention relates to air brakes, and particularly to a pipeless mount arrangement for connecting a single triple valve to a plurality of reservoirs and to a brake cylinder.

While generally applicable to triple valves controlling flow to and from a plurality of reservoirs, the invention is developed for, and is believed to be particularly adapted to, that type of triple valve in which the auxiliary reservoir alone furnishes the air for service applications, and both reservoirs furnish the air for emergency applications.

Triple valves operating as above suggested have been devised and others are in process of development. Their outstanding advantage is the capability of effecting an emergency application following service application of any intensity, i. e. even after full equalization has occurred between the auxiliary reservoir and the brake cylinder.

In the more highly developed valves of this type, the two reservoirs never are connected directly with each other to serve as a common volume, but have independent connections to the triple valve. Independent connections are desirable not only to secure complete control of flow to the brake cylinder, but also to secure complete control of charging in order, among other things, to prevent the supplemental reservoir from absorbing undue quantities of air at the initiation of release. This, if it occurred, would hinder the propagation of the releasing pressure wave to the rear of the train.

A feature of the invention is that it is adaptable to conventional auxiliary reservoirs of the freight type. By this is meant that well known type of reservoir with the brake cylinder at its front end and the triple valve at its rear end, the brake cylinder port of the triple valve communicating directly with a pipe which leads through the interior of the auxiliary reservoir to the brake cylinder. Reservoirs of this type are standardized in railroad practice and are in such extensive use that the possibility of retaining and making use of such reservoirs is a prime economic factor in any contemplated change of brake equipment.

Another feature of marked advantage during the transition period is that the manifold structure is so contrived as to afford the possibility of substituting for the double reservoir type of triple valve an ordinary triple valve of the existing standard type, such as the well known K2 triple valve.

While the invention resides primarily in the pipeless connections, there are ancillary features in the suspending structure serving to preserve an alignment of the parts and assuring the maintenance of tight joints.

The preferred embodiment of the invention is illustrated in the accompanying drawings, in which Figure 1 is a side elevation of the equipment for a single freight car, that is to say, the auxiliary reservoir, brake cylinder, supplemental reservoir, and triple valve, together with the manifold and supporting mechanism forming the subject matter of the present invention.

Figure 2 is an elevation of the left hand end of the apparatus shown in Figure 1, the triple valve being removed.

Figure 3 is a section on the line 3—3 of Figure 6.

Figure 4 is a plan view of the apparatus shown in Figure 1, the triple valve being partially broken away.

Figure 5:
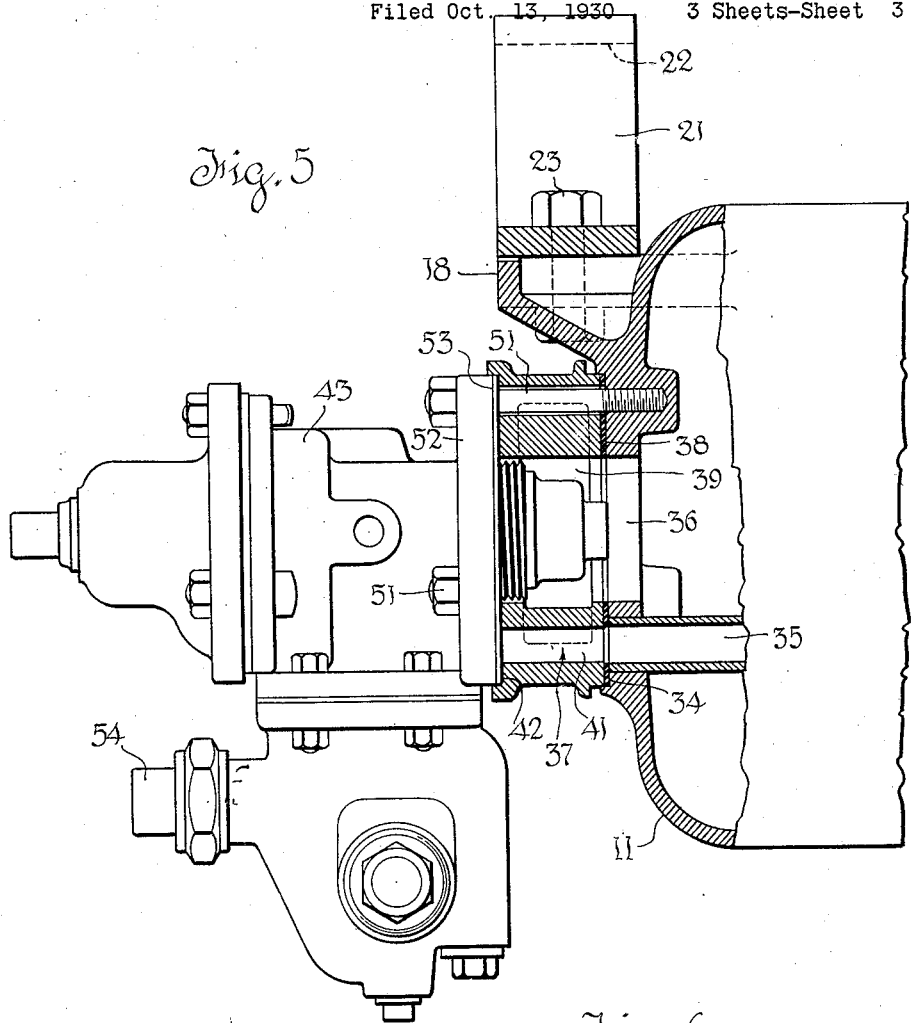
Figure 5 is an enlarged view similar to the left hand portion of Figure 1, and showing the reservoir and the pipeless manifold partially sectioned on the line 5—5 of Figure 6.
Figure 6:
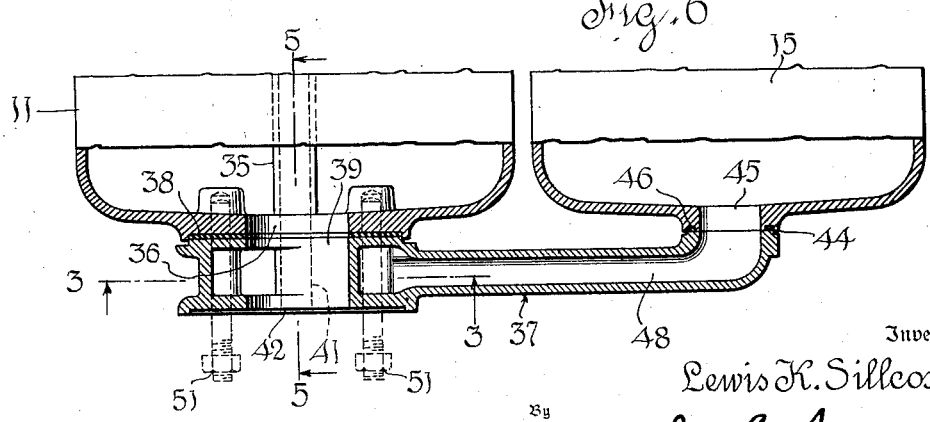
Figure 6 is a section on the line 6—6 of Figure 2.

In the drawings, 11 represents the auxiliary reservoir, 12 the brake cylinder, 13 the "non-pressure head" or piston rod guide of the brake cylinder, 14 the tubular piston rod, and 15 the supplemental reservoir which when used merely to furnish air for emergency applications is sometimes called an emergency reservoir. 16 is a bleed valve on the auxiliary reservoir.

As is standard freight practice, brake cylinder 12 is flanged and bolted to the end of the auxiliary reservoir 11, as indicated at 17. The supplemental reservoir 15 is smaller in diameter than the auxiliary reservoir 11 and its length approximates the length of the auxiliary reservoir plus the body portion of the brake cylinder. They are mounted with their axes parallel.

The auxiliary reservoir 11 is provided with a bolting lug 18 and the supplemental reservoir with a bolting lug 19. These seat against the under face of a stirrup iron 21 which is formed with flanges 22 intended to be bolted to the framing of the car (not shown). The lugs 18 and 19 are connected to the stirrup iron 21 by bolts 23 and the lugs are preferably so located that the axes of the two reservoirs lie in the same horizontal plane, though this is not essential.

It is customary to support freight brake cylinders from the framing of the car by heavy stirrup irons which extend substantially the entire length of the body of the cylinder, and that practice is followed with a slight modification in the present invention. The stirrup iron is indicated generally by the numeral 24 and has one bolting flange 25 which extends substantially the full length of the cylinder and is provided with bolt holes as usual. The other flange 26 is similar, but shorter, to provide space for a lateral extension 27. To this is bolted lug 28 on the supplemental reservoir 15. The extension 27 is bent upward and has a flange 29 which is intended for bolting to the frame work of the car.

It will be observed that the stirrup iron 24 is connected to the brake cylinder by six bolts 31 which preclude any angular movement of the stirrup iron relatively to the cylinder. The extension 27 is provided with a lip 32 which engages the lug 28, and the stirrup iron 21 is formed with a similar lip 33 which engages the lug 19. These lips together with the bolts 23 prevent any shifting of the reservoir 15 relatively to the brake cylinder 12 or connected reservoir 11.

The fact that the brake cylinder and both reservoirs are rigidly connected together, and thus held against any relative shifting, is a matter of the utmost importance because the manifold about to be described would be likely to leak if the reservoirs were subject to shifting under the stresses developed by the operation of the brake cylinder.

The reservoir 11 (see Figure 5) has the usual seating face 34 for a triple valve at the end remote from the brake cylinder 12. From this seating face leads the usual brake cylinder pipe 35. The brake cylinder pipe 35 leads through the reservoir and communicates through the forward end thereof with the interior of the brake cylinder 12. In the center of the seating face 34 is the usual auxiliary reservoir port 36.

In the present conventional practice, the triple valve is bolted against the face 34 with an intervening suitably ported gasket. The port 36 offers communication between the interior of the reservoir and the slide valve chamber of the triple valve. The brake pipe port of the triple valve registers with the pipe 35. The gasket secures a tight seal to isolate the ports from each other and prevent leakage to atmosphere.

According to the present invention the triple valve is not mounted on the face 34, but instead a manifold indicated generally by the reference numeral 37 is substituted. This manifold makes a tight joint with the reservoir by means of a suitably ported gasket 38, and is provided with a through passage 39 which forms an extension of the passage 36 and a through passage 41 which forms an extension of the brake cylinder pipe 35. The manifold thus has a ported face which mates with the seating face 34. Opposite this mating face the manifold is formed with a seating face 42 to receive a triple valve 43 of the type controlling flow to and from a plurality of reservoirs,—two in the present instance.

On the rear end of the supplemental reservoir 15 is a pad or seating face 44 having a port 45 leading to the interior of the reservoir 15. The port 45 is surrounded by a gasket 46. The manifold 37 has a face which mates with the face 44 and is held thereagainst by machine screws or other threaded connections 47.

The passage 48 in the manifold offers in conjunction with the port 45 a continuous passage from the interior of the reservoir 15 to a port 49 extending through the seating face 42.

It will be observed that the passages 39, 41 and 48 are wholly isolated from each other and all three open on the seating face 42. The triple valve 43 is connected by studs 51, three being shown, which extend through the mounting flange 52 of the triple valve and also through the manifold 37 and are threaded into the head of the auxiliary reservoir 11. A ported gasket 53 is interposed between the valve 52 and the manifold 37 to secure a tight joint.

As will be readily understood from an examination of Figure 3, the openings in the manifold 37, through which the studs 51 pass, are entirely isolated from the passages 39, 41 and 48. The passage 39 offers a direct connection from the slide valve chamber of the triple valve to the interior of the auxiliary reservoir 11. The passage 41 offers a direct connection from the brake cylinder port of the triple valve to the brake cylinder pipe 35 in the reservoir. The passage 48 and port 49 offer direct connection from the supplemental reservoir 15 to a supplemental reservoir port (not shown) in the triple valve.

It is deemed unnecessary to show the supplemental reservoir port in the triple valve for the reason that its exact form is dependent on the particular form of triple valve chosen for illustration. Such ports in triple valves are known. They assume various specifically different forms, and their form is immaterial to the present invention. For the same reason it is deemed unnecessary to discuss the construction of the triple valve in detail beyond pointing out that the connection 54 is the brake pipe connection.

The construction above described is inherently rigid. The manifold is simple and rugged in construction, and avoids the use of any threaded pipe connections whatsoever. It is capable of receiving a triple valve and of affording independent connections from that valve to each of two reservoirs, and to the brake cylinder.

The auxiliary reservoir and brake cylinder adhere to present standards. Aside from the economic importance of this feature, it is of great practical importance during the transition period from existing standards to the new type of triple valve with two reservoirs. In the early stages of transition, the stock of new triple valves at repair shops will necessarily be small, while all repair stations will have old type triple valves in stock. In the event of faulty operation of a new triple valve, it can be removed and an old type triple valve can be substituted. The old type triple valve being devoid of an emergency reservoir port, merely blanks port 49 in the manifold. If the manifold is damaged it may be removed and an old type triple may be mounted directly on the auxiliary reservoir.

The present embodiment of the invention has been worked out, particularly with a view to the use of existing standard material so far as possible, and with a view to taking care of the transition period; but certain features of the invention are of general applicability and might be availed of in embodiments specifically different from that illustrated. Thus, modifications are contemplated.

The claims of the present application which are directed to the manifold member connecting the two reservoirs with the triple valve, are expressly limited to a manifold or so-called pipeless unit. In its broad aspects the relation of the face which seats on the auxiliary reservoir and the face which receives the triple valve, together with their porting, are the invention of another.

What is claimed is:

1. The combination of a member having a seating face provided with ports, one an auxiliary reservoir port and another a brake cylinder port; a supplemental reservoir having a seating face provided with a port leading into said supplemental reservoir; a manifold having faces adapted to mate with the aforementioned seating faces and also a third seating face adapted to receive a triple valve, said manifold having passages leading from ports in said third seating face to ports in said mating faces which register with the aforesaid auxiliary reservoir, brake cylinder and supplemental reservoir ports; a triple valve mounted on said third seating face and having ports which register with the ports therein; and releasable means for holding the parts in assembled relation.

2. The combination of claim 1 further characterized in that the first-named seating face is adapted to receive a triple valve of the type requiring a single auxiliary reservoir whereby the removal of the manifold will permit the emergency substitution of such a triple valve.

3. The combination of an auxiliary reservoir having a seating face provided with ports, one leading into the reservoir and another to the brake cylinder; a supplemental reservoir having a seating face provided with a port leading into the supplemental reservoir; a manifold having mating faces adapted to mate with the aforementioned seating faces and also a third seating face adapted to receive a triple valve, said manifold having passages leading from ports on said third seating face to ports on said mating faces which register with the aforesaid ports leading to the auxiliary reservoir, brake cylinder and supplemental reservoir; a triple valve mounted on said third seating face and having ports which register with the ports therein; and threaded connections for holding the parts in assembled relation.

4. The combination of claim 3 further characterized in that certain of the threaded connections connect the triple valve with a reservoir and clamp a portion of the manifold between the two.

5. The combination of claim 3 further characterized in that the third seating face on the manifold, and that mating face which seats on the auxiliary reservoir are directly opposed to each other, and certain of the threaded connectors engage the triple valve and auxiliary reservoir and pass through a portion of the manifold which intervenes between the auxiliary reservoir and triple valve.

6. The combination of claim 3 further characterized in that the seating face on the auxiliary reservoir will receive and connect in lieu of the manifold, a conventional triple valve of the type controlling flow to and from a single reservoir, whereby emergency substitution of such a triple valve is rendered possible.

7. The combination of a brake cylinder; an auxiliary reservoir, on one end of which said brake cylinder is mounted, said reservoir having a seating face provided with ports, one leading into the reservoir and another to the brake cylinder; a supplemental reservoir having a seating face provided with a port leading into the supplemental reservoir; a manifold having mating faces adapted to mate with the aforementioned seating faces and also a third seating face adapted to receive a triple valve, said manifold having passages leading from ports on said third seating face to ports on said mating faces which register with the aforesaid ports leading to the auxiliary reservoir, brake cylinder and supplemental reservoir; a triple valve mounted on said third seating face and having ports which register with the ports therein; threaded connectors for holding the parts in assembled relation; and supporting means common to the reservoirs and brake cylinder.

8. The combination of claim 7 further characterized in that certain of the threaded connections connect the triple valve with a reservoir and clamp a portion of the manifold between the two.

9. The combination of claim 7 further characterized in that the third seating face on the manifold, and that mating face which seats on the auxiliary reservoir are directly opposed to each other, and certain of the threaded connectors engage the triple valve and auxiliary reservoir and pass through a portion of the manifold which intervenes between the auxiliary reservoir and triple valve.

10. The combination of claim 7 further characterized in that the seating face on the auxiliary reservoir will receive and connect in lieu of the manifold, a conventional triple valve of the type controlling flow to and from a single reservoir, whereby emergency substitution of such a triple valve is rendered possible.

11. A manifold for air brakes of the double reservoir type, said manifold having a ported face adapted to mate with the triple-valve mounting face of a conventional freight-type auxiliary reservoir, and communicate with the usual auxiliary reservoir and brake cylinder ports therein, a ported face adapted to mate with a face on a supplemental reservoir and communicate with the supplemental reservoir port therein, and a mounting face for a triple valve, the manifold having passages leading from the last-named mounting face to said mating faces to establish individual communications to the reservoirs and brake cylinder.

12. The combination of claim 11 further characterized in that the first-named mating face and the triple valve mounting face are opposed to each other, and the manifold has openings isolated from said passages and extending between such faces for the passage of threaded connectors between auxiliary reservoir and triple valve.

13. The combination of a plurality of reservoirs; a brake cylinder mounted on one of said reservoirs; a manifold connected with said reservoirs, and making flanged joints therewith; and a supporting structure common to the two reservoirs and serving to prevent relative shifting thereof.

14. The combination of claim 13 in which the two reservoirs are generally cylindrical and mounted with their axes parallel, and the supporting structure includes stirrup irons having lugs which prevent longitudinal shifting of one of the reservoirs.

15. The combination of an auxiliary reservoir having a seating face provided with ports, one leading into the reservoir and another to the brake cylinder; a supplemental reservoir having a seating face provided with a port leading into the supplemental reservoir; a manifold having mating faces adapted to mate with the aforementioned seating faces, and also a third seating face adapted to receive a triple valve, said manifold having passages leading from ports on said third seating face to ports on said mating faces which register with the aforesaid ports leading to the auxiliary reservoir brake cylinder and supplemental reservoir, the spacing of the brake cylinder and auxiliary reservoir ports on said third seating face conforming to the spacing of the corresponding ports on the auxiliary seating face.

In testimony whereof I have signed my name to this specification.

LEWIS K. SILLCOX.